(12) United States Patent
Peng et al.

(10) Patent No.: US 12,205,551 B2
(45) Date of Patent: Jan. 21, 2025

(54) DISPLAY PANEL AND DISPLAY DEVICE

(71) Applicants: Beijing BOE Display Technology Co., Ltd., Beijing (CN); BOE Technology Group Co., Ltd., Beijing (CN)

(72) Inventors: Xiangjun Peng, Beijing (CN); Tiankuo Shi, Beijing (CN); Shuo Zhang, Beijing (CN); Yifan Hou, Beijing (CN); Zhihua Ji, Beijing (CN); Xiaomang Zhang, Beijing (CN); Xin Duan, Beijing (CN); Wei Sun, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,918

(22) PCT Filed: Jan. 4, 2022

(86) PCT No.: PCT/CN2022/070067
§ 371 (c)(1),
(2) Date: Jan. 19, 2023

(87) PCT Pub. No.: WO2023/130207
PCT Pub. Date: Jul. 13, 2023

(65) Prior Publication Data
US 2024/0249690 A1    Jul. 25, 2024

(51) Int. Cl.
*G09G 3/34*  (2006.01)

(52) U.S. Cl.
CPC ..... *G09G 3/3426* (2013.01); *G09G 2320/066* (2013.01); *G09G 2360/16* (2013.01)

(58) Field of Classification Search
CPC ............ G02F 1/1336; G09G 2320/066; G09G 2360/16; G09G 3/34; G09G 3/3426; G09G 3/36
See application file for complete search history.

(56) References Cited

U.S. PATENT DOCUMENTS 10,877,335 B2 * 12/2020 Chen ..................... G09G 3/3611
2019/0064559 A1    2/2019 Harada et al.
(Continued)

FOREIGN PATENT DOCUMENTS

| CN | 109064979 A | 12/2018 |
| CN | 210428032 U | 4/2020 |
| CN | 111965888 A | 11/2020 |

*Primary Examiner* — Robin J Mishler
(74) *Attorney, Agent, or Firm* — WHDA, LLP

(57) ABSTRACT

A dimming method for a display panel is provided, including: acquiring image data of an image to be displayed; determining initial dimming pixel data of each of dimming pixels according to the image data; determining a dimming pixel to be filtered in the dimming screen according to the initial dimming pixel data of each of dimming pixels; determining a first filtering region according to the determined dimming pixel to be filtered; determining a filtering parameter of each of dimming pixels in the first filtering region according to a relationship between each of dimming pixels in the first filtering region and initial dimming pixel data of each of dimming pixels in the first filtering region; and updating dimming pixel data of the dimming pixel to be filtered according to the filtering parameter of each of dimming pixels in the first filtering region, so as to obtain updated dimming pixel data.

20 Claims, 12 Drawing Sheets

(56) References Cited

U.S. PATENT DOCUMENTS

2020/0082769 A1 3/2020 Sun et al.
2020/0371386 A1 11/2020 Liou et al.

* cited by examiner

DISPLAY PANEL AND DISPLAY DEVICE

CROSS-REFERENCE TO RELATED APPLICATION

This application is a Section 371 National Stage Application of International Application No. PCT/CN2022/070067, filed on Jan. 4, 2022, entitled "DISPLAY PANEL AND DISPLAY DEVICE", the content of which is hereby incorporated by reference in its entirety.

TECHNICAL FIELD

The present disclosure relates to a field of display technology, and in particular, to a display panel and a display device.

BACKGROUND

A local dimming technology may change a backlight brightness in real time according to a displayed image, so as to save a backlight power consumption and improve a picture contrast. A liquid crystal display panel may include two overlapping liquid crystal screens, one for displaying images, and the other for local dimming. Such a liquid crystal display panel may significantly improve a contrast, and a display effect is comparable to that of an organic light-emitting diode (OLED) display panel. The liquid crystal display panel including two liquid crystal screens may be called a double-cell liquid crystal display panel. Through a dual-screen control, the double-cell liquid crystal display panel may achieve a contrast of more than 100,000 levels and a high-precision dynamic dimming of million level partitions, and is favored by customers.

The above information disclosed in this section is merely for the understanding of the background of a technical concept of the present disclosure. Therefore, the above information may contain information that does not constitute a related art.

SUMMARY

In an aspect, a dimming method for a display panel is provided, wherein the display panel includes a dimming screen and a display screen, the dimming screen is arranged on a backlight side of the display screen and is configured to perform a backlight modulation on the display screen, the dimming screen includes a plurality of dimming pixels, and the display screen includes a plurality of display pixels. The dimming method includes: acquiring image data of an image to be displayed; determining initial dimming pixel data of each of the dimming pixels according to the image data; determining a dimming pixel to be filtered in the dimming screen according to the initial dimming pixel data of each of the dimming pixels, so as to obtain a determined dimming pixel to be filtered; determining a first filtering region according to the determined dimming pixel to be filtered, wherein the first filtering region is centered on the determined dimming pixel to be filtered, the first filtering region comprises a first predetermined number of dimming pixels in a first direction and a second direction intersecting the first direction; determining a filtering parameter of each of the dimming pixels in the first filtering region according to a relationship between each of the dimming pixels in the first filtering region and the initial dimming pixel data of each of the dimming pixels in the first filtering region; and updating dimming pixel data of the dimming pixel to be filtered according to the filtering parameter of each of the dimming pixels in the first filtering region, so as to obtain updated dimming pixel data.

According to some exemplary embodiments, the determining a filtering parameter of each of the dimming pixels in the first filtering region according to a relationship between each of the dimming pixels in the first filtering region and the initial dimming pixel data of each of the dimming pixels in the first filtering region includes: determining a first filtering coefficient K1 of each of the dimming pixels in the first filtering region according to the initial dimming pixel data of each of the dimming pixels in the first filtering region, wherein the first filtering coefficient of each of the dimming pixels in the first filtering region is positively correlated with the initial dimming pixel data of each of the dimming pixels in the first filtering region.

According to some exemplary embodiments, the determining a filtering parameter of each of the dimming pixels in the first filtering region according to a relationship between each of the dimming pixels in the first filtering region and the initial dimming pixel data of each of the dimming pixels in the first filtering region includes: determining a second filtering coefficient K2 of each of the dimming pixels in the first filtering region according to a first contrast curve, wherein a first contrast is a ratio of the initial dimming pixel data of the dimming pixel to be filtered in the first filtering region to the initial dimming pixel data of each of the dimming pixels in the first filtering region, and the first contrast curve indicates a relationship between the second filtering coefficient and the first contrast.

According to some exemplary embodiments, the determining a filtering parameter of each of the dimming pixels in the first filtering region according to a relationship between each of the dimming pixels in the first filtering region and the initial dimming pixel data of each of the dimming pixels in the first filtering region includes: determining a third filtering coefficient K3 of each of the dimming pixels in a second filtering region according to a second contrast curve, wherein the second filtering region is centered on the determined dimming pixel to be filtered, the second filtering region comprises a second predetermined number of dimming pixels in the first direction and the second direction, and the second predetermined number is less than the first predetermined number, a second contrast is a ratio of a maximum value of the initial dimming pixel data of each of the dimming pixels in the second filtering region to the initial dimming pixel data of each of the dimming pixels in the second filtering region, and the second contrast curve indicates a relationship between the third filtering coefficient and the second contrast.

According to some exemplary embodiments, the determining a filtering parameter of each of the dimming pixels in the first filtering region according to a relationship between each of the dimming pixels in the first filtering region and the initial dimming pixel data of each of the dimming pixels in the first filtering region includes: determining a fourth filtering coefficient K4 of each of the dimming pixels in the first filtering region according to a distance between each of the dimming pixels in the first filtering region and the dimming pixel to be filtered, wherein the fourth filtering coefficient of each of the dimming pixels in the first filtering region is negatively correlated with the distance between each of the dimming pixels in the first filtering region and the dimming pixel to be filtered.

According to some exemplary embodiments, the determining a first filtering coefficient of each of the dimming pixels in the first filtering region according to the initial dimming pixel data of each of the dimming pixels in the first filtering region includes: determining, by using a first filtering coefficient formula, the first filtering coefficient of each of the dimming pixels in the first filtering region according to the initial dimming pixel data of each of the dimming pixels in the first filtering region, wherein the first filtering coefficient formula is expressed as:

$$K1 = -\frac{1}{255^2} \times V^2 + \frac{2}{255} \times V$$

where V represents the initial dimming pixel data of each of the dimming pixels.

According to some exemplary embodiments, in the first contrast curve, for the first contrast in an interval of [0,1], the second filtering coefficient K2 is negatively correlated with the first contrast; and for the first contrast greater than or equal to 1, the second filtering coefficient K2 is equal to 1.

According to some exemplary embodiments, in the second contrast curve, the third filtering coefficient K3 is negatively correlated with the second contrast.

According to some exemplary embodiments, the determining a filtering parameter of each of the dimming pixels in the first filtering region according to a relationship between each of the dimming pixels in the first filtering region and the initial dimming pixel data of each of the dimming pixels in the first filtering region includes: determining a filtering coefficient K of each of the dimming pixels in the first filtering region according to the first filtering coefficient K1, the second filtering coefficient K2, the third filtering coefficient K3 and the fourth filtering coefficient K4; normalizing the filtering coefficient K of each of the dimming pixels in the first filtering region to obtain a normalized filtering coefficient KA of each of the dimming pixels in the first filtering region; calculating a sum KAS of the normalized filtering coefficients KA of each of the dimming pixels in the first filtering region; and dividing the normalized filtering coefficient KA of each of the dimming pixels in the first filtering region by the sum KAS to obtain the filtering parameter of each of the dimming pixels in the first filtering region.

According to some exemplary embodiments, the first predetermined number is 5, and the second predetermined number is 3.

According to some exemplary embodiments, the display panel further includes a backlight source arranged on a side of the dimming screen away from the display screen and configured to provide a backlight, the display screen includes a plurality of display partitions, the backlight source includes a plurality of backlight partitions, the plurality of display partitions correspond to the plurality of backlight partitions respectively, and the display partition includes a plurality of display pixels. The dimming method further includes: determining a display partition requiring dimming and a backlight partition corresponding to the display partition requiring dimming according to a display pixel to be dimmed; determining a plurality of dimming pixels corresponding to the display partition requiring dimming; and determining a backlight value of the backlight partition corresponding to the display partition requiring dimming according to updated dimming pixel data of the plurality of dimming pixels corresponding to the display partition requiring dimming.

According to some exemplary embodiments, the plurality of dimming pixels corresponding to the display partition requiring dimming include a first dimming pixel, a second dimming pixel and a third dimming pixel, an orthographic projection of the first dimming pixel on the display screen at least partially overlaps with at least one of the plurality of display pixels in the display partition requiring dimming, the second dimming pixel and the third dimming pixel are adjacent to the first dimming pixel in the second direction respectively, and the second dimming pixel and the third dimming pixel are located on opposite sides of the first dimming pixel in the second direction.

According to some exemplary embodiments, the determining a backlight value of the backlight partition corresponding to the display partition requiring dimming according to updated dimming pixel data of the plurality of dimming pixels corresponding to the display partition requiring dimming includes: determining the backlight value of the backlight partition corresponding to the display partition requiring dimming according to the updated dimming pixel data of the plurality of dimming pixels corresponding to the display partition requiring dimming by using a weighted summation method.

According to some exemplary embodiments, the dimming method further includes: determining initial display pixel data of a display pixel to be dimmed according to the image data; and determining a compensation coefficient of the display pixel to be dimmed according to the initial display pixel data of the display pixel to be dimmed and the backlight value of the backlight partition corresponding to the display pixel to be dimmed.

According to some exemplary embodiments, the compensation coefficient of the display pixel to be dimmed is determined according to the initial display pixel data of the display pixel to be dimmed and the backlight value of the backlight partition corresponding to the display pixel to be dimmed by using a compensation coefficient formula, the compensation coefficient formula is expressed as:

$$\left(\frac{Q}{1023}\right)^{\gamma 2} = f\left(\frac{\left(\frac{W}{255}\right)^{\gamma 0} \times 2^{16} \times \frac{1}{SBL^{\gamma 1}} \times 12^{19}}{2^{11}}\right)$$

where Q represents the compensation coefficient. W represents the initial display pixel data, SBL represents the backlight value, f represents rounding, and γ0, γ1 and γ2 are preset values.

According to some exemplary embodiments, the dimming method further includes: adjusting display pixel data of the display pixel to be dimmed according to the determined compensation coefficient of the display pixel to be dimmed.

According to some exemplary embodiments, an orthographic projection of one dimming pixel on the display screen at least partially overlaps with a plurality of display pixels arranged in m rows and m columns, where m is a positive integer greater than 1. The determining initial dimming pixel data of each of the dimming pixels according to the image data includes: determining initial display pixel data of each of the display pixels according to the image data; and determining, according to the initial display pixel data of the plurality of display pixels arranged in m rows and m columns, the initial dimming pixel data of the dimming pixel overlapping with the plurality of display pixels arranged in m rows and m columns.

According to some exemplary embodiments, the determining, according to the initial display pixel data of the plurality of display pixels arranged in m rows and m columns, the initial dimming pixel data of the dimming pixel overlapping with the plurality of display pixels arranged in m rows and m columns includes: progressively sampling the plurality of display pixels arranged in m rows and m columns to obtain sampling data of each row, wherein the sampling data of each row is a weighted sum of a maximum value and a mean value of the initial display pixel data of a plurality of display pixels in the row; and determining the maximum value in the sampling data of m rows as the initial dimming pixel data of the dimming pixel.

In another aspect, a dimming device for a display panel is provided, wherein the display panel includes a dimming screen and a display screen, the dimming screen is arranged on a backlight side of the display screen and is configured to perform a backlight modulation on the display screen, the dimming screen includes a plurality of dimming pixels, the display screen includes a plurality of display pixels. The dimming device includes: an image data acquisition module configured to acquire image data of an image to be displayed, an initial dimming pixel data determination module configured to determine initial dimming pixel data of each of the dimming pixels according to the image data; a dimming-pixel-to-be-filtered determination module configured to determine a dimming pixel to be filtered in the dimming screen according to the initial dimming pixel data of each of the dimming pixels, so as to obtain a determined dimming pixel to be filtered; a first filtering region determination module configured to determine a first filtering region according to the determined dimming pixel to be filtered, wherein the first filtering region is centered on the determined dimming pixel to be filtered, the first filtering region comprises a first predetermined number of dimming pixels in a first direction and a second direction intersecting the first direction; a filtering parameter determination module configured to determine a filtering parameter of each of the dimming pixels in the first filtering region according to a relationship between each of the dimming pixels in the first filtering region and the initial dimming pixel data of each of the dimming pixels in the first filtering region; and a dimming pixel data update module configured to update dimming pixel data of the dimming pixel to be filtered according to the filtering parameter of each of the dimming pixels in the first filtering region, so as to obtain updated dimming pixel data.

In another aspect, a display device is provided, including: one or more processors; a storage device configured to store one or more programs, wherein the one or more programs, when executed by the one or more processors, cause the one or more processors to implement the method described above.

In another aspect, a computer-readable storage medium having an executable instruction stored thereon is provided, and the instruction, when executed by a processor, causes the processor to implement the method described above.

BRIEF DESCRIPTION OF THE DRAWINGS

By describing in detail exemplary embodiments of the present disclosure with reference to the drawings, features and advantages of the present disclosure will become more apparent.

DETAILED DESCRIPTION OF EMBODIMENTS

Figure 1:
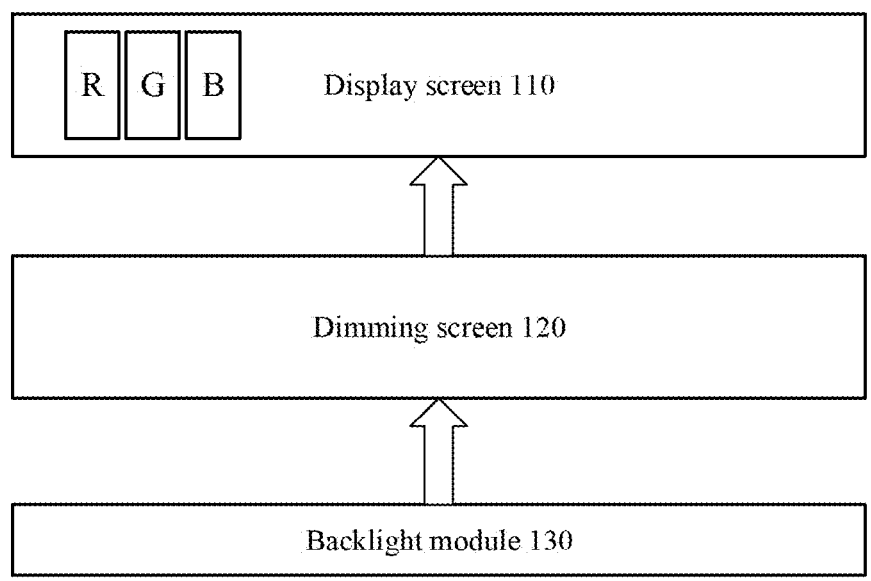
FIG. 1 shows a schematic structural diagram of a display panel provided by at least one embodiment of the present disclosure.

In order to make objectives, technical solutions and advantages of the present disclosure clearer, the technical solutions of embodiments of the present disclosure will be clearly and completely described below with reference to the accompanying drawings. Obviously, the described embodiments are merely some embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that, in the accompanying drawings, for clarity and/or description purposes, a size and relative size of an element may be enlarged. Accordingly, the size and relative size of each element need not to be limited to those shown in the figures. In the specification and the accompanying drawings, the same or similar reference numerals indicate the same or similar components.

When an element is described as being "on", "connected to" or "coupled to" another element, the element may be directly on the other element, directly connected to the other element, or directly coupled to the other element, or an intermediate element may be provided. However, when an element is described as being "directly on", "directly connected to" or "directly coupled to" another element, no intermediate element is provided. Other terms and/or expressions used to describe a relationship between elements, such as "between" and "directly between", "adjacent" and "directly adjacent", "on" and "directly on", and so on, should be interpreted in a similar manner. In addition, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure. "at least one of X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", "middle", "both sides". "inside" and "outside" may be used herein to describe a relationship between one element or feature and another element or feature as shown in the figures. It should be understood that the spatial relationship terms are intended to cover other different orientations of a device in use or operation in addition to the orientation described in the figures. For example, if the device in the figures is turned upside down, an element or feature described as "below" or "under" another element or feature will be oriented "above" or "on" the other element or feature.

Embodiments of the present disclosure provide a dimming method for a display panel. The display panel includes a dimming screen and a display screen. The dimming screen is arranged on a backlight side of the display screen and is used to perform a backlight modulation on the display screen. The dimming screen includes a plurality of dimming pixels, and the display screen includes a plurality of display pixels. The dimming method includes: acquiring image data of an image to be displayed; determining initial dimming pixel data of each of the dimming pixels according to the image data; determining dimming pixel to be filtered in the dimming screen according to the initial dimming pixel data of each of the dimming pixels; determining a first filtering region according to the determined dimming pixel to be filtered, wherein the first filtering region is centered on the determined dimming pixel to be filtered, and the first filtering region includes a first predetermined number of dimming pixels in a first direction and includes the first predetermined number of dimming pixels in a second direction intersecting the first direction; determining a filtering parameter of each of the dimming pixels in the first filtering region according to a relationship between each of the dimming pixels in the first filtering region and the initial dimming pixel data of each of the dimming pixels in the first filtering region; and updating dimming pixel data of the dimming pixel to be filtered according to the filtering parameter of each of the dimming pixels in the first filtering region, so as to obtain updated dimming pixel data. In embodiments of the present disclosure, a dimming method for a display panel suitable for a dislocation of dual screens in any precision range is proposed, which may be implemented to perform a dimming using a dynamic filtering algorithm when an alignment deviation between the dimming screen and the display screen is unknown, so that a good display image quality may be obtained without increasing an amount of FPGA resources.

FIG. 1 shows a schematic structural diagram of a display panel provided by at least one embodiment of the present disclosure. As shown in FIG. 1, a display panel 10 includes a display screen 110, a dimming screen 120, and a backlight module 130. The dimming screen 120 is arranged between the backlight module 130 and the display screen 110. The backlight module 130 is arranged on a backlight side of the dimming screen 120 (that is, a side of the dimming screen 120 away from the display screen 110) and is configured to provide a backlight to the dimming screen 120. The display screen 110 and the dimming screen 120 are stacked. The dimming screen 120 is arranged on a backlight side of the display screen 110 (that is, a side of the display screen 110 close to the backlight module 130) and is configured to perform a backlight modulation on the display screen 110. The display screen 110 is configured to display an image. For example, a display region (active region) of the display screen 110 and a dimming region (active region) of the dimming screen 120 may overlap with each other, for example, may have a same size in both a length direction and a width direction.

For example, in embodiments of the present disclosure, the display panel 10 is a liquid crystal display panel, and the display screen 110 and the dimming screen 120 are both liquid crystal screens. Embodiments of the present disclosure have no limitations on a type, a structure, etc. of the liquid crystal screen used to implement the display screen 110 and the dimming screen 120. For example, the liquid crystal screen may be of a vertical electric field type or a horizontal electric field type. For example, in a case of the horizontal electric field type, the liquid crystal screen may be of an in-plane switching (IPS) type, a fringe field switching (FFS) type, an advanced super dimension switching (ADS) type, and so on.

Similarly, embodiments of the present disclosure have no limitations on a type, a structure, etc. of the backlight module 130. For example, the backlight module 130 may be of an edge lighting type or a direct illumination type, and a light source used may be cold cathode fluorescence or a light emitting diode (LED).

Figure 2A:
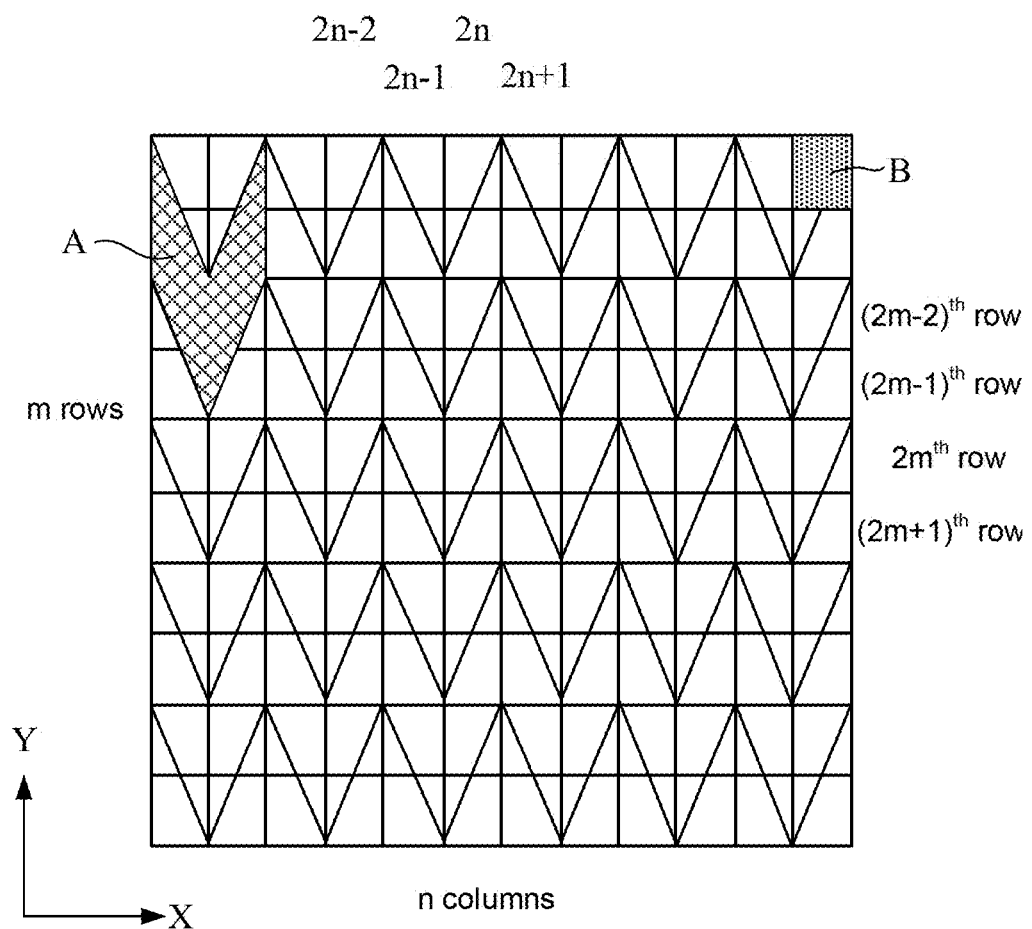
FIG. 2A to FIG. 2C respectively show schematic diagrams of a pixel distribution (pixel array) of a display screen and a pixel distribution of a dimming screen in the display panel shown in FIG. 1, in which different alignment states are schematically shown in FIG. 2A to FIG. 2C.
Figure 2B:
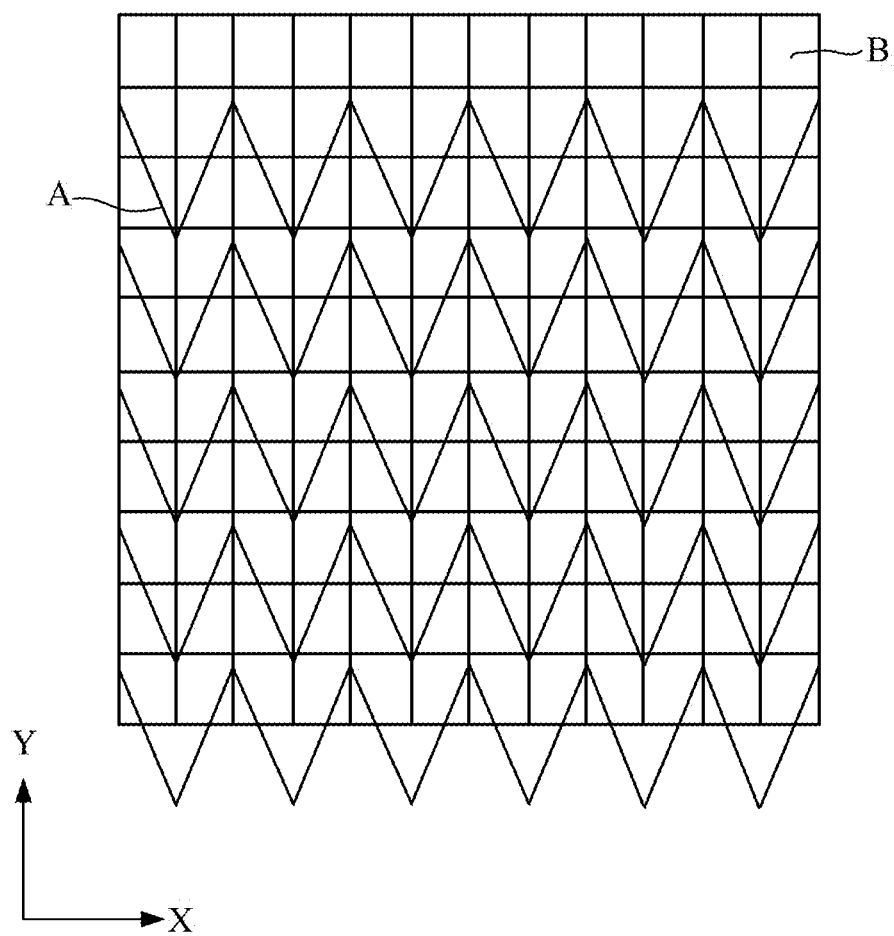
Figure 2C:
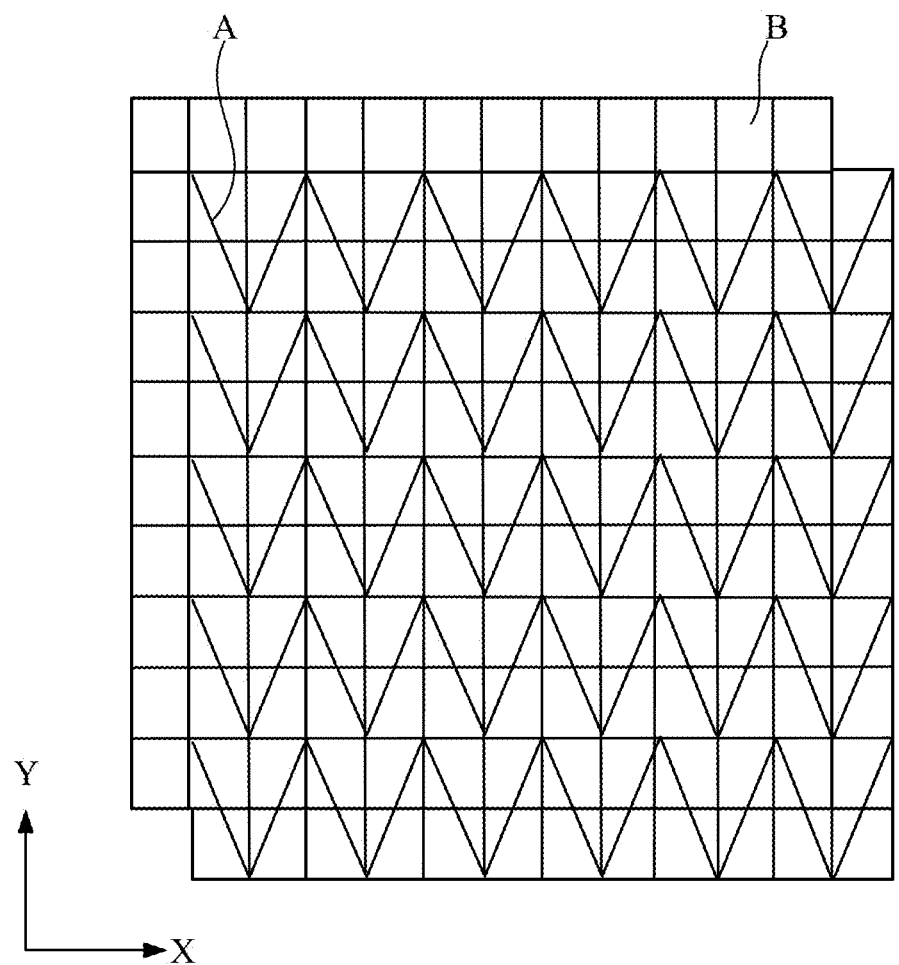

FIG. 2A to FIG. 2C respectively show schematic diagrams of a pixel distribution (pixel array) of a display screen and a pixel distribution of a dimming screen in the display panel shown in FIG. 1, in which different alignment states are schematically shown in FIG. 2A to FIG. 2C.

As shown in FIG. 2A to FIG. 2C, the dimming region of the dimming screen 120 may include a plurality of dimming pixels A, which may be arranged in M rows and N columns, where M and N are positive integers, $3 \leq M$, $3 \leq N$. For simplicity, a plurality of gate lines and a plurality of data lines used for the dimming pixels A and pixel electrodes respectively included in the dimming pixels A are omitted from the figures. These gate lines and data lines intersect each other to define a plurality of pixel regions for the dimming pixels A, and shapes of these gate lines and/or data lines define shapes of these pixel regions. In each of the dimming pixels A, a shape of the pixel electrode may be substantially the same as that of the pixel region. For example, as shown in FIG. 2A, each of the dimming pixels A of the dimming screen 120 may have a "V" shape.

Corresponding to the "V" shape, the gate line for the dimming pixel A is zigzag and the data line is linear. For example, in some embodiments, the dimming screen 120 is a Full High-Definition (FHD) liquid crystal display screen with a 2K resolution. The dimming screen 120 may include 1080*1920 dimming pixels. In this case, M=1080, N=1920. For example, the dimming screen 120 may include 964*363 dimming pixels. In this case, M=964, N=363.

The display region of the display screen 110 may include a plurality of display pixels B, which may be arranged in αM rows and αN columns, where a is a positive integer. For simplicity, a plurality of gate lines and a plurality of data lines used for the display pixels B and pixel electrodes respectively included in the display pixels B are omitted from the figures. These gate lines and data lines intersect each other to define a plurality of pixel regions for the display pixels B, and shapes of these gate lines and/or data lines define shapes of these pixel regions. In each display pixel B, a shape of the pixel electrode may be substantially the same as that of the pixel region. For example, as shown in FIG. 2A, each display pixel B of the display screen 110 may be a rectangle. Corresponding to the rectangle, the gate line for the display pixel B is linear and the data line is also linear. For example, in some embodiments, the display screen 110 is an Ultra High-Definition liquid crystal display screen with a 4K resolution. The display screen 110 may include 2160*384 display pixels. In this case, M=1080, N=1920, α=2. For example, the display screen 110 may include 1920*720 display pixels. In this case, M=1920, N=720, α is approximately equal to 2.

In some embodiments, when α=2, one row of dimming pixels of the dimming screen 120 may correspond to two rows of display pixels of the display screen 110. For example, a $m^{th}$ row of dimming pixels of the dimming screen 120 may correspond to a $(2m-1)^{th}$ row of display pixels and a $2m^{th}$ row of display pixels of the display screen 110, where $1 \le m \le M$.

When α=2, one column of dimming pixels of the dimming screen 120 may correspond to two columns of display pixels of the display screen 110. For example, a $n^{th}$ column of dimming pixels of the dimming screen 120 may correspond to a $(2n-1)^{th}$ column of display pixels and a $2n^{th}$ column of display pixels of the display screen 110, where $1 \le n \le N$.

That is to say, one dimming pixel of the dimming screen 120 located in the $m^{th}$ row and the $n^{th}$ column may correspond to four display pixels of the display screen 110, which are respectively located in the $(2m-1)^{th}$ row and the $(2n-1)^{th}$ column, the $(2m-1)^{th}$ row and the $2n^{th}$ column, the $2m^{th}$ row and the $(2n-1)^{th}$ column, and the $2m^{th}$ row and the $2n^{th}$ column.

It should be noted that since the dimming pixel of the dimming screen 120 has a "V" shape and the display pixel of the display screen 110 is a square, in a column direction of the plurality of dimming pixels of the dimming screen 120 (shown as direction Y), one row of dimming pixels of the dimming screen 120 actually spans four rows of display pixels of the display screen 110 in a physical position, that is, an orthographic projection of one row of dimming pixels of the dimming screen 120 on the display screen 110 overlaps partially with corresponding four rows of display pixels on the display screen 110.

For example, the m row of dimming pixels of the dimming screen 120 may span from the $(2m-2)^{th}$ row of display pixels to the $(2m+1)^{th}$ row of display pixels of the display screen 110, that is, the orthographic projection of the m row of dimming pixels of the dimming screen 120 on the display screen 110 overlap partially with the $(2m-2)^{th}$ row of display pixels to the $(2m+1)^{th}$ row of display pixels of the display screen 110. However, it is specified here that the $m^{th}$ row of dimming pixels of the dimming screen 120 correspond to the $(2m-1)^{th}$ row of display pixels and the $2m^{th}$ row of display pixels of the display screen 110.

In addition, it should be noted that although it is shown in FIG. 2A to FIG. 2C that the shape of the dimming pixel in the dimming screen is a "V" shape, embodiments of the present disclosure are obviously not limited to this, and the shape of the dimming pixel in the dimming screen may be other appropriate shapes different from the "V" shape. Similarly, although it is shown in FIG. 2A to FIG. 2C that the shape of the display pixel in the display screen is a rectangle, embodiments of the present disclosure are obviously not limited to this, and the shape of the display pixel in the display screen may be other appropriate shapes different from the rectangle, such as a hexagon. In embodiments of the present disclosure, the shape of the dimming pixel is a "V" shape, and the shape of the display pixel is a rectangle, which may avoid a Newton ring caused by a superposition of dual screens.

In addition, it should be noted that although FIG. 2A to FIG. 2C merely show a corresponding case of the dimming pixels of the dimming screen and the display pixels of the display screen when α=2, a case when α is equal to other values is similar to the above. For example, when α=1, one row of dimming pixels of the dimming screen may correspond to one row of display pixels of the display screen, and one column of dimming pixels of the dimming screen may correspond to one column of display pixels of the display screen. For example, when α=4, one row of dimming pixels of the dimming screen may correspond to four rows of display pixels of the display screen, and one column of dimming pixels of the dimming screen may correspond to four columns of display pixels of the display screen. Embodiments of the present disclosure do not limit the specific correspondence between the display pixel and the dimming pixel. However, for simplicity, α=2 is illustrated by way of example in describing embodiments of the present disclosure, and the cases for other values of a may refer to the descriptions of embodiments of the present disclosure when α=2.

Figure 3:
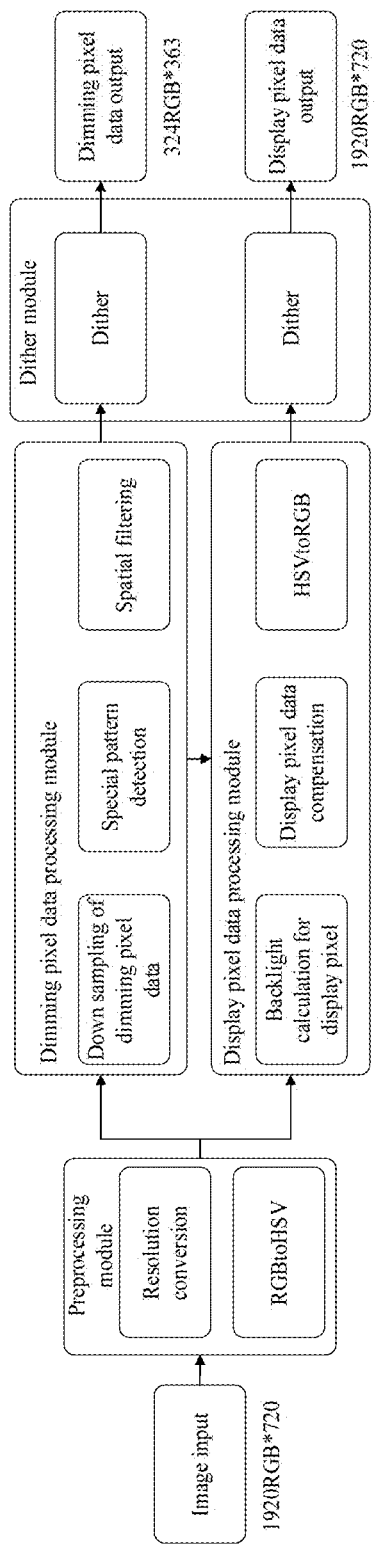
FIG. 3 shows a general flowchart of a dimming method for a display panel according to embodiments of the present disclosure.
Figure 4:
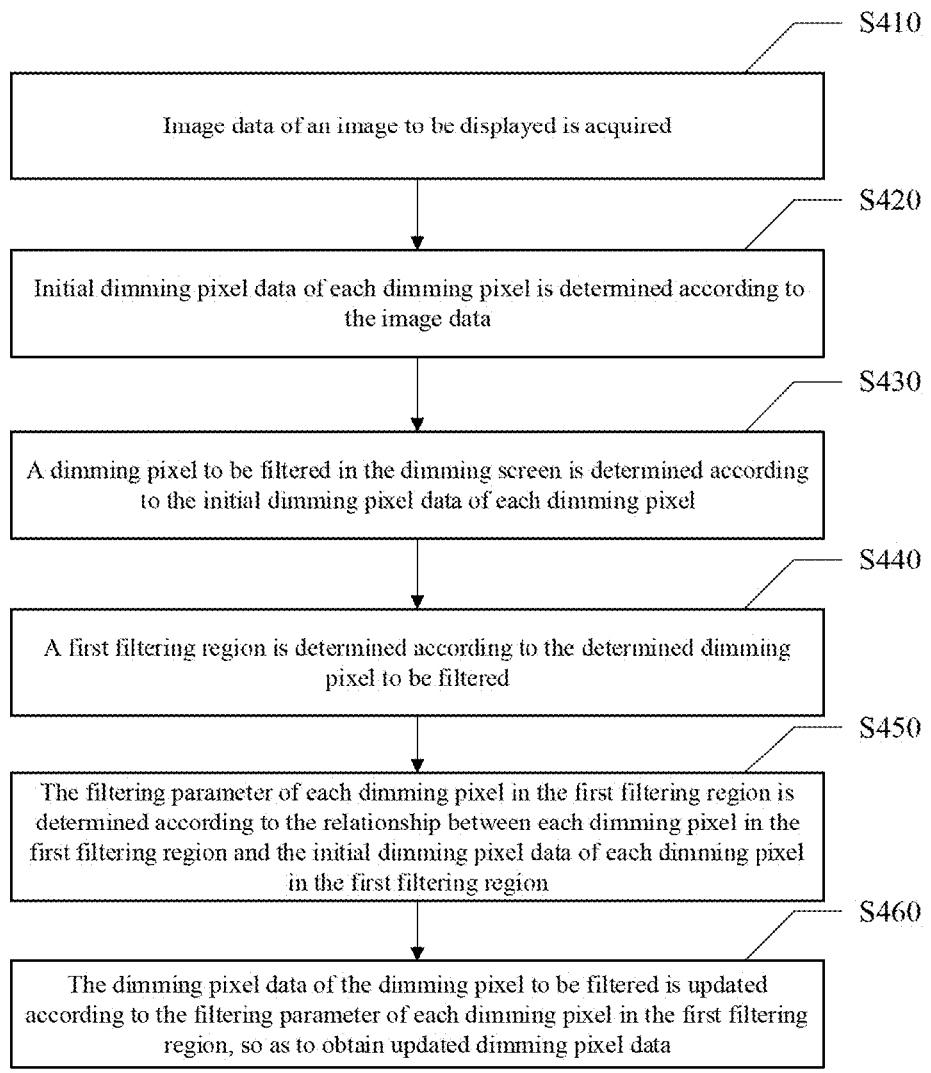
FIG. 4 shows a flowchart of a dimming method for a display panel according to some exemplary embodiments of the present disclosure, which mainly corresponds to steps performed in a dimming pixel data processing module shown in FIG. 3.

FIG. 3 shows a general flowchart of a dimming method for a display panel according to embodiments of the present disclosure. FIG. 4 shows a flowchart of a dimming method for a display panel according to some exemplary embodiments of the present disclosure, which mainly corresponds to steps performed in a dimming pixel data processing module shown in FIG. 3.

Referring to FIG. 3 and FIG. 4, in embodiments of the present disclosure, the dimming method for the display panel may mainly include a preprocessing step performed in a preprocessing module, a dimming pixel data processing step performed in a dimming pixel data processing module, and a display pixel data processing step performed in a display pixel data processing module. It should be noted that the dimming method for the display panel provided by embodiments of the present disclosure may further include some other steps, such as a dither step performed in a dither module.

In embodiments of the present disclosure, a resolution conversion and a RGB to HSV color space conversion may be performed in the preprocessing step performed in the preprocessing module. For example, in some exemplary embodiments, valid display pixels of the dimming screen are 964*363, valid display pixels of the display screen are 1920*720, and a ratio of a pixel size of the dimming screen to a pixel size of the display screen (for example, sizes in the first direction and the second direction) is 2:1. For example, a resolution of an input image (for example, an image to be displayed) is 1920*720. In this case, to make each pixel of the dimming screen have a sampling value, the resolution of the input image needs to be dilated to 1928*726. For example, a start line/column may be duplicated according to a case of no-dislocation of dual screens, and a specific method is as follows.

$$Padding(1:2, :) = V(1, :); Padding(723:726, :) = V(720, :);$$
$$Padding(:, 1:4) = V(:, 1); Padding(:, 1925:1928) = V(:, 1920);$$

Where Padding represents dilation, that is, a first row of image data of the input image with a resolution of 1920*720 is padded by two rows upward, and a 720th row of image data of the input image is padded by four lines downward, a first column of image data of the input image is padded by four columns to the left, and a 1920th column of image data of the input image is padded by four columns to the right.

After the resolution conversion is completed, the image data of the input image may be converted from RGB space to HSV space for use by the dimming screen.

In embodiments of the present disclosure, a down sampling of dimming pixel data, a special pattern detection, a spatial filtering and other operations may be performed in the dimming pixel data processing step performed in the dimming pixel data processing module.

With reference to FIG. 1 to FIG. 4, the dimming method for the display panel may include operation S410 to operation S460.

In operation S410, image data of an image to be displayed is acquired. For example, the image to be displayed may be an input image with a resolution of 1920*720, and the image data may be the image data that has been padded and converted into HSV space as described above.

In operation S420, initial dimming pixel data of each of the dimming pixels is determined according to the image data.

For example, the dimming pixel data may include a brightness in the HSV space, that is, a V value.

In embodiments of the present disclosure, the orthographic projection of one dimming pixel on the display screen at least partially overlaps with a plurality of display pixels arranged in m rows and m columns respectively, where m is a positive integer greater than 1, for example, m=2.

In operation S420, determining the initial dimming pixel data of each of the dimming pixels according to the image data specifically includes: determining initial display pixel data of each of the display pixels according to the image data; and determining the initial dimming pixel data of the dimming pixel overlapping with the plurality of display pixels arranged in m rows and m columns according to the initial display pixel data of the plurality of display pixels arranged in m rows and m columns.

Specifically, determining the initial dimming pixel data of the dimming pixel overlapping with the plurality of display pixels arranged in m rows and m columns according to the initial display pixel data of the plurality of display pixels arranged in m rows and m columns specifically includes: progressively sampling the plurality of display pixels arranged in m rows and m columns to obtain sampling data of each row, wherein the sampling data of each row is a weighted sum result of a maximum value and a mean value of the initial display pixel data of a plurality of display pixels of the row; and determining a maximum value in the sampling data of m rows as the initial dimming pixel data of the dimming pixel.

Figure 5:
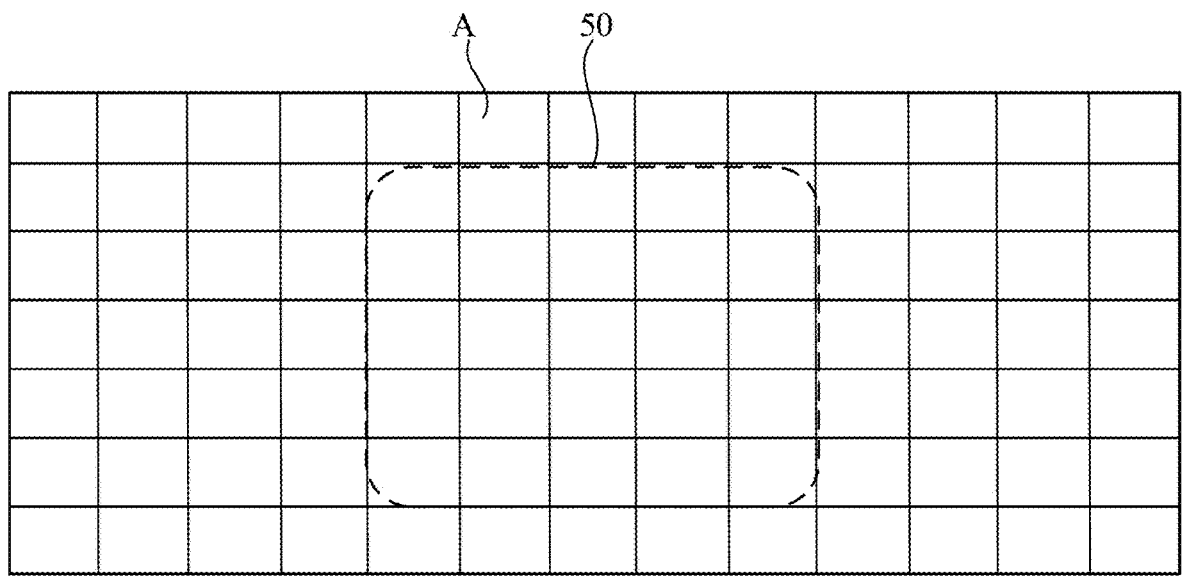
FIG. 5 shows a schematic diagram of a filtering region used in a dimming method for a display panel according to embodiments of the present disclosure.

FIG. 5 shows a schematic diagram of a filtering region used in a dimming method for a display panel according to embodiments of the present disclosure. With reference to FIG. 1 to FIG. 5, taking each of the dimming pixels corresponding to four display pixels (2 rows*2 columns) of the display screen as an example, the sampling process may include the following.

(1) In a calculation for two pixels in a first row, the first row of data is read, and a maximum value and a value are calculated and recorded Vmax and Vmean respectively. An intermediate calculation process includes:

$$nmax = NVmax * Vmax;$$
$$nmean = NVmean * Vmean;$$

A sampling result of the first row is a weighted result of the maximum value and the mean value as follows, where KVmax is a weight coefficient, and K_L1 is a sampling weight of the first row.

$$VL1 = K\_L1 * (KVmax * nmax + (1 - KVmax) * nmean);$$

(2) In a calculation for a second row, IP reads the data in the second row, and a calculation method is the same as that for the first row. A sampling result of the second row is as follows.

$$VL2 = K\_L2 * (KVmax * nmax + (1 - KVmax) * nmean);$$

Where K_L2 is a sampling weight of the second row.

A maximum value of VL2 and VL1 may be determined as a sampling result of the dimming pixel.

In operation S430, a dimming pixel to be filtered in the dimming screen is determined according to the initial dimming pixel data of each of the dimming pixels.

Figure 9A:
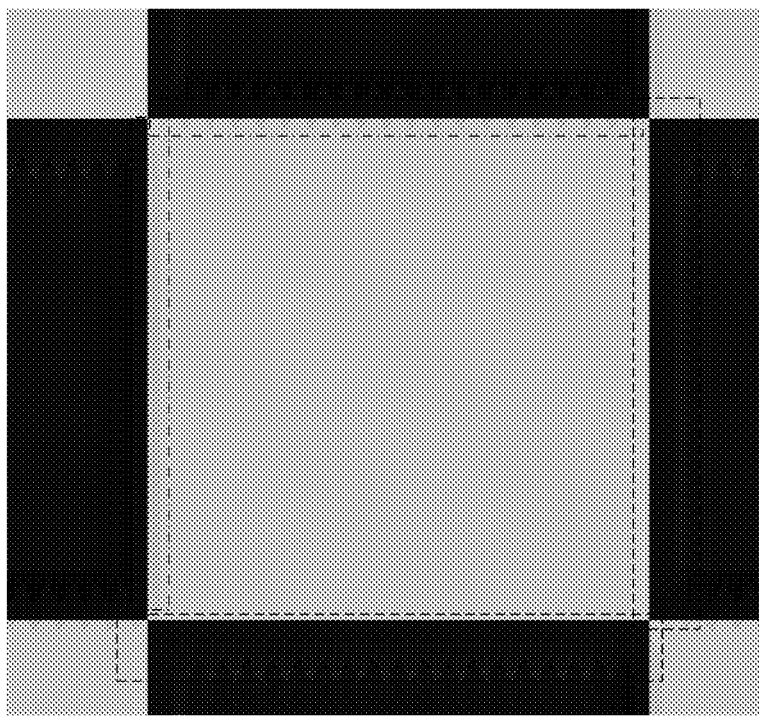
FIG. 9A shows a display effect diagram corresponding to a state shown in FIG. 2C.

FIG. 2C schematically shows a state in which the display screen is shifted by one pixel to the upper left relative to the dimming screen. FIG. 9A shows a display effect diagram corresponding to the state shown in FIG. 2C. With reference to FIG. 2C and FIG. 9A, when the display screen is shifted by one pixel to the upper left relative to the dimming screen, a dark shadow appears at an edge of a bright content (as shown by the dotted line boxes on the upper and left sides) because the backlight for the bright content is not large sufficiently after the shift, while a bright shadow appears on a dark content (as shown by the dotted line boxes on the lower and right sides) because the backlight for the dark content is larger than that in a case of non-dislocation. In embodiments of the present disclosure, in order to solve a dark shadow problem around the bright content at a bright-dark border in a case of dislocation, the backlight around the bright content may be increased. At the same time, in order to make the bright shadow on the dark content smooth and have a small contrast with a background gray scale, the backlight at the bright-dark border may be transited as smoothly as possible.

In embodiments of the present disclosure, filtering is performed according to the image data of the image to be displayed, so that the brightness (V value) of the dimming pixel at the bright-dark border is increased, and the brightness (V value) of the dimming pixel is smoothly transited from bright to dark. For example, during filtering, a filtering parameter may be adaptively adjusted according to a gray scale value of pixels covered by a 5*5 filtering template, a distance between each pixel and a filtering center, and a gray scale contrast between each pixel and a center pixel, so that the brightness (V value) of the dimming pixel at the bright-dark border may be increased, and the brightness (V value) of the filtered dimming pixel may be smooth.

That is, in embodiments of the present disclosure, the dimming pixel to be filtered in the dimming screen may be determined according to the initial dimming pixel data of each of the dimming pixels, for example, at least one dimming pixel at the bright-dark border may be determined as the dimming pixel to be filtered in the dimming screen.

Optionally, in embodiments of the present disclosure, before determining the dimming pixel to be filtered in the dimming screen, the dimming method may further include a special pattern detection, for example, a bright line detection, as shown in FIG. 2B. It may be understood that the bright line detection may be performed using various known bright line detection methods, and then a bright line may be compensated using a data dilation method. A specific method may refer to existing bright line compensation methods, which will not be described in detail here.

Optionally, in embodiments of the present disclosure, before determining the dimming pixel to be filtered in the dimming screen, the dimming pixel data of a pixel may be determined. For example, the pixel may be used as a center of the filtering region, and when the dimming pixel data (such as gray scale value) of the central dimming pixel is the maximum value of the dimming pixel data (such as gray scale value) of each of the dimming pixels in the filtering region, the following filtering steps may not be performed.

In operation S440, a first filtering region is determined according to the determined dimming pixel to be filtered. The first filtering region is centered on the determined dimming pixel to be filtered, the first filtering region includes a first predetermined number of dimming pixels in a first direction and a second direction intersecting the first direction. For example, the first direction may be an X direction or a row direction shown in FIG. 2A, and the second direction may be a Y direction or a column direction shown in FIG. 2A. FIG. 5 schematically shows a first filtering region 50, as shown by a rounded rectangle box in FIG. 5.

In embodiments of the present disclosure, determining the filtering parameter of each of the dimming pixels in the first filtering region according to the relationship between each of the dimming pixels in the first filtering region and the initial dimming pixel data of each of the dimming pixels in the first filtering region may specifically include: determining a first filtering coefficient K1 of each of the dimming pixels in the fast filtering region according to the initial dimming pixel data of each of the dimming pixels in the first filtering region, wherein the first filtering coefficient of each of the dimming pixels in the first filtering region is positively correlated with the initial dimming pixel data of each of the dimming pixels in the first filtering region.

For example, determining the first filtering coefficient of each of the dimming pixels in the first filtering region according to the initial dimming pixel data of each of the dimming pixels in the first filtering region may specifically include: determining the first filtering coefficient of each of the dimming pixels in the first filtering region according to the initial dimming pixel data of each of the dimming pixels in the first filtering region by using a first filtering coefficient formula as follows:

$$K1 = -\frac{1}{255^2} \times V^2 + \frac{2}{255} \times V$$

Where V represents the initial dimming pixel data of each of the dimming pixels.

Figure 6:
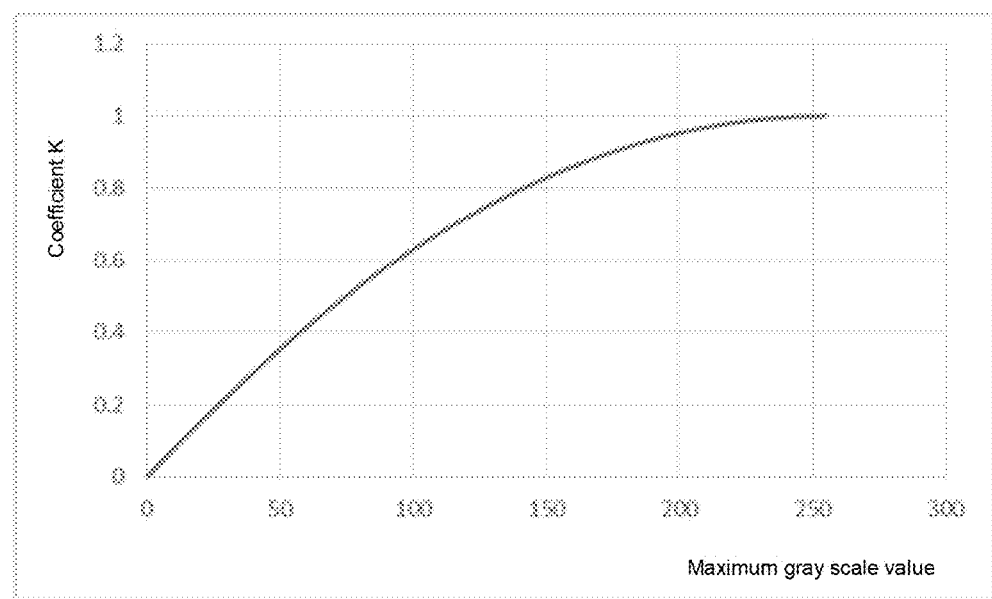
FIG. 6 schematically shows a relationship curve between a first filtering coefficient and dimming pixel data.

FIG. 6 schematically shows a relationship curve between a first filtering coefficient and dimming pixel data. Referring to FIG. 6, in embodiments of the present disclosure, the larger the dimming pixel data (e.g., the brightness of the dimming pixel, that is, the V value), the greater an influence of the dimming pixel data on the filtering value, that is, the first filtering coefficient is proportional to the dimming pixel data, and it is desired that a contribution of the dimming pixel data to the filtering value may be approximately 1 when the dimming pixel data is close to 255. In this way, the dimming pixels around a bright dimming pixel may be as bright as possible, so that the brightness may be sufficiently large when the bright content is dislocated.

In embodiments of the present disclosure, determining the filtering parameter of each of the dimming pixels in the first filtering region according to the relationship between each of the dimming pixels in the first filtering region and the initial dimming pixel data of each of the dimming pixels in the first filtering region may specifically include: determining a second filtering coefficient K2 of each of the dimming pixels in the fast filtering region according to a first contrast curve. The first contrast is a ratio of the initial dimming pixel data of the dimming pixel to be filtered in the first filtering region to the initial dimming pixel data of each of the dimming pixels in the first filtering region. The first contrast curve indicates a relationship between the second filtering coefficient and the first contrast.

Figure 7:
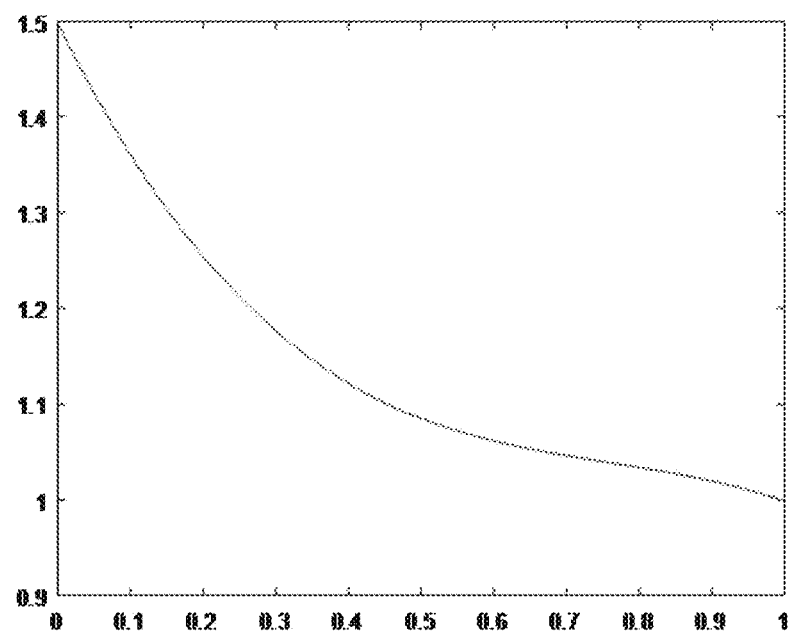
FIG. 7 schematically shows a first contrast curve used in a dimming method for a display panel according to embodiments of the present disclosure.

FIG. 7 schematically shows a first contrast curve used in a dimming method for a display panel according to embodiments of the present disclosure. Referring to FIG. 7, in the first contrast curve, when the first contrast is in an interval of [0,1], the second filtering coefficient K2 is negatively correlated with the first contrast; when the first contrast is greater than or equal to 1, the second filtering coefficient K2 is equal to 1.

Since a brightness increase degree of the dimming pixel at the bright-dark border is related to the gray scale value of the bright content, a relationship between the filtering center and a pixel at a neighborhood position needs to be considered during the filtering. In embodiments of the present disclosure, that relationship is indicated by the first contrast. For example, with reference to FIG. 5, the first contrast may be defined as a ratio of the gray scale value of a central dimming pixel of a 5*5 template (that is, each of the dimming pixels in the first filtering region) to the gray scale value of each of the dimming pixels at a position covered by the 5*5 template. The smaller the first contrast is, the smaller the gray scale value of the central dimming pixel is than the gray scale value of each of the dimming pixels at the position covered by the 5*5 template, and the greater the filtering weight of each of the dimming pixels at the position covered by the 5*5 template needs to be, so that the gray scale value of the central dimming pixel may be closer to the bright content.

In embodiments of the present disclosure, determining the filtering parameter of each of the dimming pixels in the first filtering region according to the relationship between each of the dimming pixels in the first filtering region and the initial dimming pixel data of each of the dimming pixels in the first filtering region may specifically include: determining a third filtering coefficient K3 of each of the dimming pixels in a second filtering region according to a second contrast curve. The second filtering region is centered on the determined dimming pixel to be filtered. The second filtering region includes a second predetermined number of dimming pixels in the first direction and the second direction. The second predetermined number is less than the first predetermined number. A second contrast is a ratio of a maximum value of the initial dimming pixel data of each of the dimming pixels in the second filtering region to the initial dimming pixel data of each of the dimming pixels in the second filtering region. The second contrast curve indicates a relationship between the third filtering coefficient and the second contrast.

Figure 8:
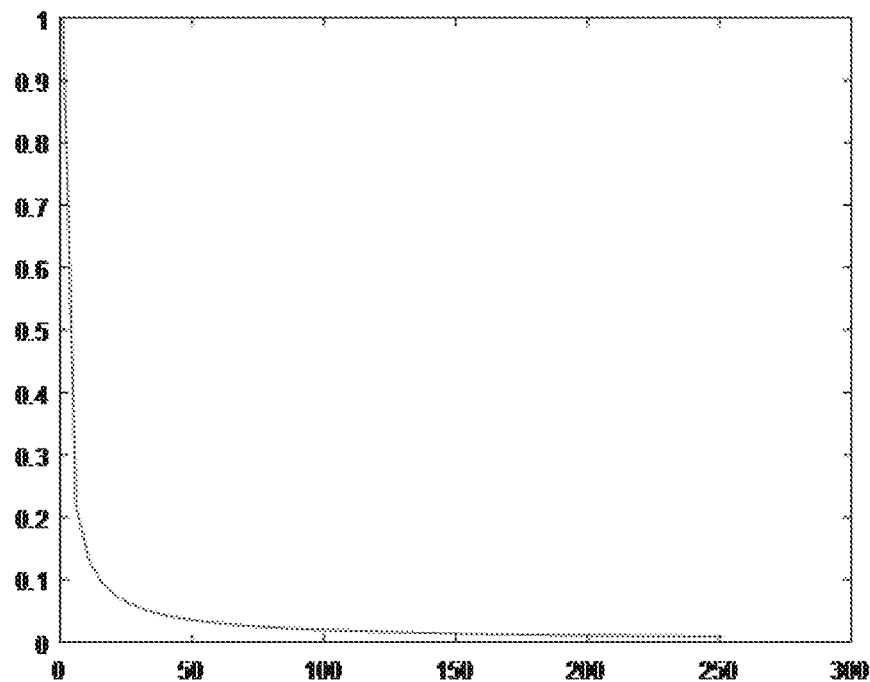
FIG. 8 schematically shows a second contrast curve used in a dimming method for a display panel according to embodiments of the present disclosure.

FIG. 8 schematically shows a second contrast curve used in a dimming method for a display panel according to embodiments of the present disclosure. Referring to FIG. 8, in the second contrast curve, the third filtering coefficient K3 is negatively correlated with the second contrast.

By setting the first filtering coefficient K1 and the second filtering coefficient K2 as described above, the dimming pixel having a gray scale value smaller than the gray scale value of the central dimming pixel still has a weight, so that the gray scale value or brightness increase degree of the dimming pixel at the bright-dark border may be not large sufficiently. In that step, it is possible to further reduce the weight of the dimming pixel having a gray scale value smaller than that of the center dimming pixel, so as to further reduce the influence of the dimming pixel having a gray scale value smaller than that of the center dimming pixel on a filtering result. On this basis, the third filtering coefficient K3 may be determined according to the second contrast. For example, the second contrast may be defined as a ratio of a maximum value of gray scale values of a 3*3 region centered on the center of the first filtering region to a gray scale value of each position of the 3*3 region. The larger the second contrast is, the smaller the dimming pixel at the corresponding position is than the center dimming pixel, and the smaller the filtering coefficient may be set.

In embodiments of the present disclosure, determining the filtering parameter of each of the dimming pixels in the first filtering region according to the relationship between each of the dimming pixels in the first filtering region and the initial dimming pixel data of each of the dimming pixels in the first filtering region may specifically include: determining a fourth filtering coefficient K4 of each of the dimming pixels in the first filtering region according to a distance between each of the dimming pixels in the first filtering region and the dimming pixel to be filtered. The fourth filtering coefficient of each of the dimming pixels in the first filtering region is negatively correlated with the distance between each of the dimming pixels in the first filtering region and the dimming pixel to be filtered.

Table 1 show the fourth filtering coefficients of the dimming pixels at various positions covered by the 5*5 template. As shown in Table 1, the fourth filtering coefficient of each of the dimming pixels in the first filtering region is negatively correlated to the distance between each of the dimming pixels in the first filtering region and the dimming pixel to be filtered. For example, the fourth filtering coefficient K4 of a central dimming pixel is 52, the fourth filtering coefficient K4 of four dimming pixels adjacent to the central dimming pixel in the first direction or the second direction is 25, the fourth filtering coefficient K4 of six dimming pixels far from the central dimming pixel is 10, the fourth filtering coefficient K4 of ten dimming pixels farther from the central dimming pixel is 3, and the fourth filtering coefficient K4 of four dimming pixels farthest from the central dimming pixel (i.e., the dimming pixels at four corners) is 1.

TABLE 1

Fourth Filtering Coefficients of Dimming Pixels at Positions Covered by 5*5 Template

| 1 | 3  | 10 | 3  | 1 |
|---|----|----|----|---|
| 3 | 10 | 25 | 10 | 3 |
| 3 | 25 | 52 | 25 | 3 |
| 3 | 10 | 25 | 10 | 3 |
| 1 | 3  | 10 | 3  | 1 |

In operation S450, the filtering parameter of each of the dimming pixels in the first filtering region is determined according to the relationship between each of the dimming pixels in the first filtering region and the initial dimming pixel data of each of the dimming pixels in the first filtering region.

In embodiments of the present disclosure, determining the filtering parameter of each of the dimming pixels in the first filtering region according to the relationship between each of the dimming pixels in the first filtering region and the initial dimming pixel data of each of the dimming pixels in the first filtering region may specifically include: determining a filtering coefficient K of each of the dimming pixels in the first filtering region according to the first filtering coefficient K1, the second filtering coefficient K2, the third filtering coefficient K3 and the fourth filtering coefficient K4; normalizing the filtering coefficient K of each of the dimming pixels in the first filtering region to obtain a normalized filtering coefficient KA of each of the dimming pixels in the first filtering region; calculating a sum KAS of the normalized filtering coefficient KA of each of the dimming pixels in the first filtering region; and dividing the normalized filtering coefficient KA of each of the dimming pixels in the first filtering region by the sum KAS to obtain the filtering parameter of each of the dimming pixels in the first filtering region.

In operation S460, the dimming pixel data of the dimming pixel to be filtered is updated according to the filtering parameter of each of the dimming pixels in the first filtering region, so as to obtain updated dimming pixel data.

For example, a weighted mean may be performed on the initial dimming pixel data of each of the dimming pixels at the 5*5 template position by using the filtering parameter of each of the dimming pixels at the 5*5 template position as a weight coefficient, and a result of the weighted mean may be determined as the dimming pixel data of the dimming pixel to be filtered.

Figure 9B:
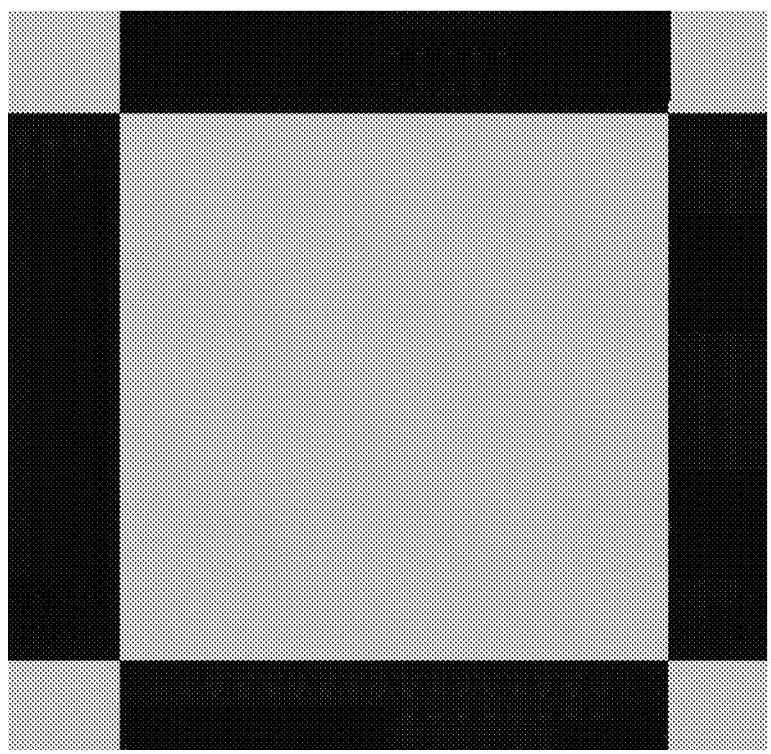
FIG. 9B schematically shows a display effect diagram according to updated dimming pixel data.

Through such updating, the dimming pixel data (such as gray scale value or brightness) of each of the dimming pixels at the bright-dark border may be improved, and the updated dimming pixel data (such as gray scale value or brightness) may be smooth. FIG. 9B schematically shows a display effect diagram according to updated dimming pixel data.

Comparing FIG. 9A and FIG. 9B, the dark shadow around the bright content disappears, and the bright shadow on the dark content is almost invisible.

It should be noted that in the aforementioned embodiments, the first predetermined number is 5, and the second predetermined number is 3, that is, the first filtering region is a 5*5 region, and the second filtering region is a 3*3 region. However, embodiments of the present disclosure are not limited to this. In other embodiments, filtering regions of other sizes may be selected.

Referring to FIG. 3, in embodiments of the present disclosure, a backlight calculation of the display screen, a data compensation of display pixels and other operations may be performed in the display pixel data processing step performed in the display pixel data processing module.

Referring to FIG. 1, the display panel further includes a backlight source. The backlight source is arranged on a side of the dimming screen away from the display screen and is configured to provide a backlight. The display screen includes a plurality of display partitions, and the backlight source includes a plurality of backlight partitions. The plurality of display partitions correspond to the plurality of backlight partitions respectively, and the display partition includes a plurality of display pixels.

In embodiments of the present disclosure, the dimming method further includes: determining a display partition requiring dimming and a backlight partition corresponding to the display partition requiring dimming according to a display pixel to be dimmed; determining a plurality of dimming pixels corresponding to the display partition requiring dimming; and determining a backlight value of the backlight partition corresponding to the display partition requiring dimming according to the updated dimming pixel data of a plurality of dimming pixels corresponding to the display partition requiring dimming.

In embodiments of the present disclosure, the plurality of dimming pixels corresponding to the display partition requiring dimming include a first dimming pixel, a second dimming pixel, and a third dimming pixel. An orthographic projection of the first dimming pixel on the display screen at least partially overlaps with at least one of the plurality of display pixels in the display partition requiring dimming. The second dimming pixel and the third dimming pixel are adjacent to the first dimming pixel in the second direction respectively, and the second dimming pixel and the third dimming pixel are located on opposite sides of the first dimming pixel in the second direction.

For example, determining the backlight value of the backlight partition corresponding to the display partition requiring dimming according to the updated dimming pixel data of the plurality of dimming pixels corresponding to the display partition requiring dimming may specifically include: determining the backlight value of the backlight partition corresponding to the display partition requiring dimming according to the updated dimming pixel data of the plurality of dimming pixels corresponding to the display partition requiring dimming by using a weighted summation method.

Figure 10:
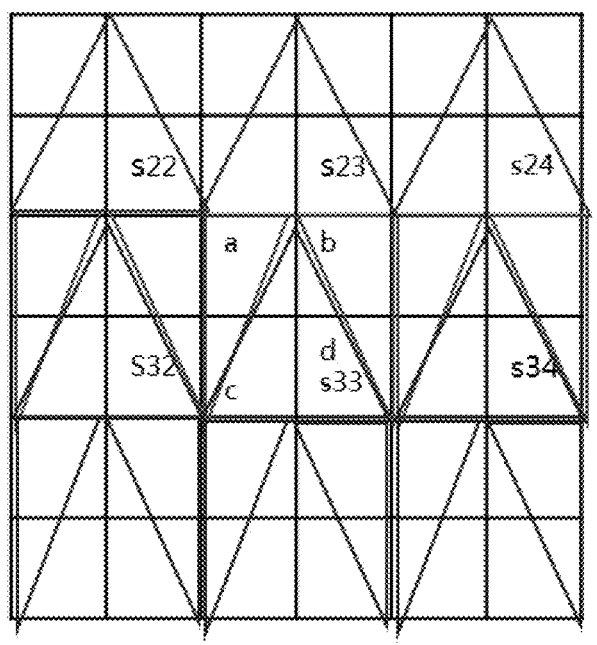
FIG. 10 schematically shows a schematic diagram for a backlight correction.

FIG. 10 schematically shows a schematic diagram for a backlight correction. With reference to FIG. 1, FIG. 2C and FIG. 10, the backlight value corresponding to each display pixel in the display screen may be obtained by weighting six adjacent dimming pixels. For example, in FIG. 10, the backlight values corresponding to four display pixels a, b, c and d may be obtained by weighting the dimming pixel data (e.g., gray scale value or brightness) of six dimming pixels S22, S23, S24, S32, S33 and S34. For example, the backlight values corresponding to the display pixels a and c may be obtained by weighting the dimming pixel data (e.g., gray scale value or brightness) of the dimming pixels S23, S33, S22 and S32. The backlight values corresponding to the display pixels b and d may be obtained by weighting the dimming pixel data (e.g., gray scale value or brightness) of the dimming pixels S23, S24, S33 and S34. A specific calculation formula may be as follows.

$$SBL(a) = a1*VS22 + a2*VS23 + a3*VS32 + a4*VS33,$$

$$SBL(c) = c1*VS22 + c2*VS23 + c3*VS32 + c4*VS33,$$

$$SBL(b) = b1*VS23 + b2*VS24 + b3*VS33 + b4*VS34,$$

$$SBL(d) = d1*VS23 + d2*VS24 + d3*VS33 + d4*VS34,$$

Where SBL (a), SBL (c), SBL (b) and SBL (d) represent the backlight values corresponding to the display pixels a, c, b and d respectively; VS22, VS23, VS24, VS32, VS33 and VS34 represent the dimming pixel data (e.g., gray scale value or brightness) of the dimming pixels S22, S23, S24, S32, S33 and S34 respectively, and it should be understood that they are the values updated by using the above-mentioned methods; a1 to a4, c1 to c4, b1 to b4 and d1 to d4 represent the corresponding weight coefficients, which are preset values.

Further, in embodiments of the present disclosure, the dimming method further includes: determining initial display pixel data of the display pixel to be dimmed according to the image data; and determining a compensation coefficient of the display pixel to be dimmed according to the initial display pixel data of the display pixel to be dimmed and the backlight value of the backlight partition corresponding to the display pixel to be dimmed.

For example, the compensation coefficient of the display pixel to be dimmed may be determined according to the initial display pixel data of the display pixel to be dimmed and the backlight value of the backlight partition corresponding to the display pixel to be dimmed by using a compensation coefficient formula as follows.

$$\left(\frac{Q}{1023}\right)^{\gamma 2} = f\left(\frac{\left(\frac{W}{255}\right)^{\gamma 0} \times 2^{16} \times \frac{1}{SBL^{\gamma 1}} \times 12^{19}}{2^{11}}\right)$$

Where $Q$ represents the compensation coefficient, W represents the initial display pixel data, SBL represents the backlight value, f represents rounding, and $\gamma 0$, $\gamma 1$ and $\gamma 2$ are preset values.

In embodiments of the present disclosure, the dimming method further includes adjusting display pixel data of the display pixel to be dimmed according to the determined compensation coefficient of the display pixel to be dimmed.

For example, the display pixel data of the display pixel to be dimmed may be adjusted according to the determined compensation coefficient of the display pixel to be dimmed according to the following formula.

$$Q(R, G, B) = Q \times \left(\frac{1}{W} \times 2^{18}\right) \times \frac{\text{Input}(R, G, B)}{2^{18}}$$

Where $Q(R, G, B)$ represents the display pixel data after adjustment in the RGB space, and Input $(R, G, B)$ represents the display pixel data before adjustment in the RGB space.

Based on the above-mentioned dimming method, embodiments of the present disclosure further provide a dimming device for a display panel. The apparatus will be described in detail below with reference to FIG. 11.

Figure 11:
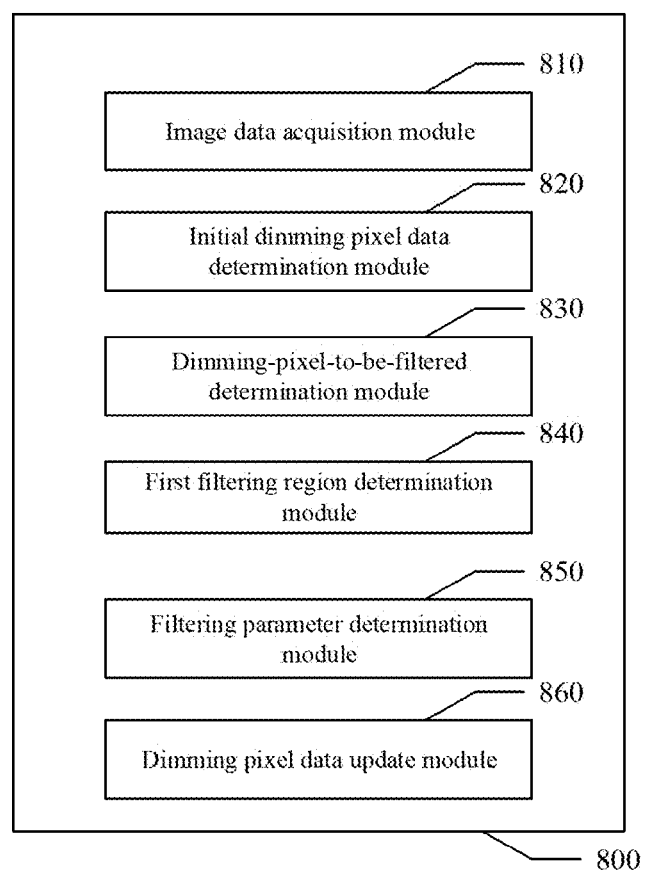
FIG. 11 schematically shows a structural block diagram of a dimming device of a display panel according to embodiments of the present disclosure.

FIG. 11 schematically shows a structural block diagram of a dimming device of a display panel according to embodiments of the present disclosure.

As shown in FIG. 11, a dimming device 800 for a display panel of such embodiments includes an image data acquisition module 810, an initial dimming pixel data determination module 820, a dimming-pixel-to-be-filtered determination module 830, a first filtering region determination module 840, a filtering parameter determination module 850, and a dimming pixel data update module 860.

The image data acquisition module 810 is used to acquire image data of an image to be displayed. In some embodiments, the image data acquisition module 810 may be used to perform the operation S410 described above, which will not be repeated here.

The initial dimming pixel data determination module 820 is used to determine initial dimming pixel data of each of the dimming pixels according to the image data. In some embodiments, the initial dimming pixel data determination module 820 may be used to perform the operation S420 described above, which will not be repeated here.

The dimming-pixel-to-be-filtered determination module 830 is used to determine a dimming pixel to be filtered in the dimming screen according to the initial dimming pixel data of each of the dimming pixels. In some embodiments, the dimming-pixel-to-be-filtered determination module 830 may be used to perform the operation S430 described above, which will not be repeated here.

The first filtering region determination module 840 is used to determine a first filtering region according to the determined dimming pixel to be filtered. The first filtering region is centered on the determined dimming pixel to be filtered. The first filtering region includes a first predetermined number of dimming pixels in a first direction and a second direction intersecting the first direction. In some embodiments, the first filtering region determination module 840 may be used to perform the operation S440 described above, which will not be repeated here.

The filter parameter determination module 850 is used to determine a filtering parameter of each of the dimming pixels in the first filtering region according to a relationship between each of the dimming pixels in the first filtering region and the initial dimming pixel data of each of the dimming pixels in the first filtering region. In some embodiments, the filtering parameter determination module 850 may be used to perform the operation S450 described above, which will not be repeated here.

The dimming pixel data update module 860 is used to update the dimming pixel data of the dimming pixel to be filtered according to the filtering parameter of each of the dimming pixels in the first filtering region, so as to obtain updated dimming pixel data. In some embodiments, the dimming pixel data update module 860 may be used to perform the operation S460 described above, which will not be repeated here.

According to embodiments of the present disclosure, any plurality of modules in the image data acquisition module 810, the initial dimming pixel data determination module 820, the dimming-pixel-to-be-filtered determination module 830, the first filtering region determination module 840, the filtering parameter determination module 850 and the dimming pixel data update module 860 may be integrated into one module for implementation, or any one module in these modules may be split into a plurality of modules. Alternatively, at least partial functions of one or more of these modules may be combined with at least partial functions of other modules and implemented in one module. According to embodiments of the present disclosure, at least one of the image data acquisition module 810, the initial dimming pixel data determination module 820, the dimming-pixel-to-be-filtered determination module 830, the first filtering region determination module 840, the filtering parameter determination module 850 and the dimming pixel data update module 860 may be implemented at least partially as a hardware circuit, such as a field programmable gate array (FPGA), a programmable logic array (PLA), a system on a chip, a system on substrate, a system on package, an Application Specific Integrated Circuit (ASIC), or may be implemented by hardware or firmware in any other reasonable manner of integrating or encapsulating the circuit, or may be implemented by any one of the three implementation manners of software, hardware and firmware or an appropriate combination thereof. Alternatively, at least one of the image data acquisition module 810, the initial dimming pixel data determination module 820, the dimming-pixel-to-be-filtered determination module 830, the first filtering region determination module 840, the filtering parameter determination module 850 and the dimming pixel data update module 860 may be at least partially implemented as a computer program module that, when executed, may perform the corresponding functions.

Figure 12:
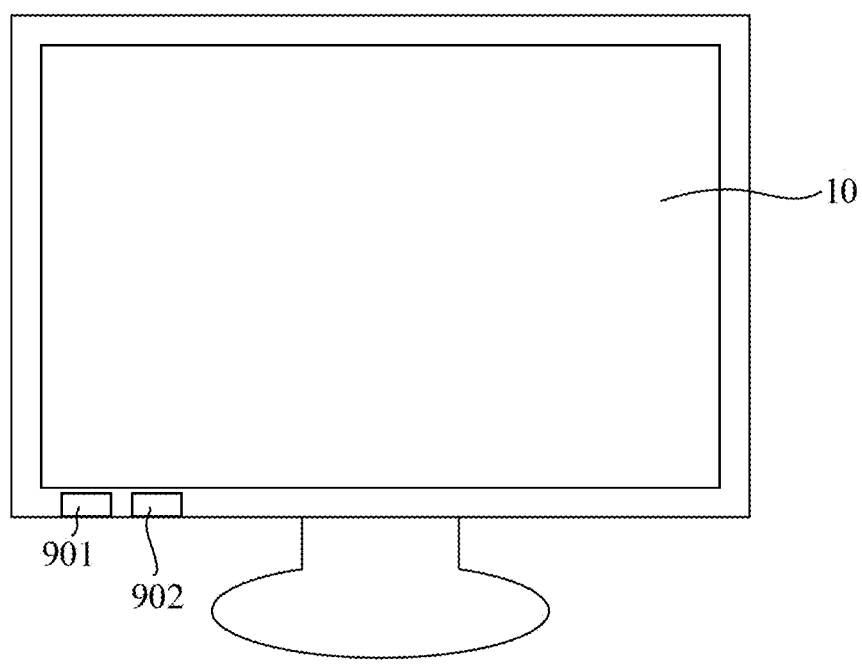
FIG. 12 shows a schematic diagram of a display device according to some exemplary embodiments of the present disclosure.

FIG. 12 shows a schematic diagram of a display device according to some exemplary embodiments of the present disclosure.

As shown in FIG. 12, a display device 900 according to embodiments of the present disclosure may include the display panel shown in FIG. 1, a processor 901, and a storage device 902 that may perform various appropriate actions and processes according to programs stored in the storage device 902. The processor 901 may include, for example, a general-purpose microprocessor (for example, CPU), an instruction set processor and/or a related chipset and/or a special-purpose microprocessor (for example, an application specific integrated circuit (ASIC)), and the like. The processor 901 may further include an on-board memory for caching purposes. The processor 901 may include a single processing unit or a plurality of processing units for executing different actions of the method flow according to embodiments of the present disclosure.

The display device may include any apparatus or product with a display function. For example, the display device may be a smart phone, a mobile phone, an e-book reader, a personal computer (PC), a laptop PC, a netbook PC, a personal digital assistant (PDA), a portable multimedia player (PMP), a digital audio player, a mobile medical apparatus, a camera, a wearable device (such as a head-mounted device, electronic clothing, electronic bracelet, electronic necklace, electronic accessory, electronic tattoo, or smart watch), a television, etc.

It should be understood that the display device according to embodiments of the present disclosure has all features and advantages of the display panel described above. The details may be referred to the above description.

The present disclosure further provides a computer-readable storage medium, which may be contained in the apparatus/device/system described in the above embodiments; or exists alone without being assembled into the apparatus/ device/system. The above-mentioned computer-readable storage medium may carry one or more programs that when executed, implement the methods according to embodiments of the present disclosure.

According to embodiments of the present disclosure, the computer-readable storage medium may be a non-transitory computer-readable storage medium that, for example, may include but not be limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

Embodiments of the present disclosure further include a computer program product including a computer program. The computer program contains a program code for an execution of the method shown in the flowchart. When the computer program product is executed in a computer system, the program code may be used to cause the computer system to implement the dimming method provided by embodiments of the present disclosure.

When the computer program is executed by the processor 901, the above-mentioned functions defined in the system/device of embodiments of the present disclosure are performed. According to embodiments of the present disclosure, the systems, devices, modules, units, etc. described above may be implemented by computer program modules.

In an embodiment, the computer program may rely on a tangible storage medium such as an optical storage device and a magnetic storage device. In another embodiment, the computer program may also be transmitted and distributed in a form of a signal on a network medium, downloaded and installed through a communication part, and/or installed from a removable medium. The program code contained in the computer program may be transmitted by any suitable network medium, including but not limited to a wireless one, a wired one, or any suitable combination of the above.

In such embodiments, the computer program may be downloaded and installed from the network through the communication part, and/or installed from the removable medium. When the computer program is executed by the processor 901, the above-mentioned functions defined in the systems of embodiments of the present disclosure may be performed. According to embodiments of the present disclosure, the systems, apparatuses, devices, modules, units, etc. described above may be implemented by computer program modules.

According to embodiments of the present disclosure, the program code for executing the computer programs provided by embodiments of the present disclosure may be written in any combination of one or more programming languages. Specifically, these computing programs may be implemented using high-level processes and/or object-oriented programming languages, and/or assembly/machine languages. Programming languages include but are not limited to Java, C++, python, "C" language or similar programming languages. The computer program code may be executed entirely on a user's computing apparatus, partially on the user's computing apparatus, partially on a remote computing apparatus, or entirely executed on the remote computing apparatus or a server. In a case of involving the remote computing apparatus, the remote computing apparatus may be connected to the user's computing apparatus through any type of network, including a local area network (LAN) or a wide area network (WAN), or it may be connected to an external computing apparatus (for example, via the Internet through an Internet service provider).

The flowcharts and block diagrams in the accompanying drawings illustrate the possible architecture, functions and operations of the systems, methods and computer program products according to various embodiments of the present disclosure. In this regard, each block in the flowcharts or block diagrams may represent a part of a module, a program segment or a code, which part contains one or more executable instructions for implementing the specified logical function. It should be further noted that, in some alternative implementations, the functions noted in the blocks may also occur in an order different from that noted in the accompanying drawings. For example, two blocks shown in succession may actually be executed substantially in parallel, or they may sometimes be executed in a reverse order, depending on the functions involved. It should be further noted that each block in the block diagrams or flowcharts and the combination of blocks in the block diagrams or flowcharts may be implemented by a dedicated hardware-based system that performs the specified functions or operations, or may be implemented by a combination of dedicated hardware and computer instructions.

Although some embodiments of a general technical concept of the present disclosure have been illustrated and described, it should be understood by those ordinary skilled in the art that these embodiments may be changed without departing from a principle and spirit of the general technical concept of the present disclosure. The scope of the present disclosure is defined by the claims and their equivalents.

What is claimed is:

1. A dimming method for a display panel, the display panel comprising a dimming screen and a display screen, the dimming screen being arranged on a backlight side of the display screen and being configured to perform a backlight modulation on the display screen, the dimming screen comprising a plurality of dimming pixels, and the display screen comprising a plurality of display pixels; the dimming method comprising:
   acquiring image data of an image to be displayed;
   determining initial dimming pixel data of each of the dimming pixels according to the image data;
   determining a dimming pixel to be filtered in the dimming screen according to the initial dimming pixel data of each of the dimming pixels;
   determining a first filtering region according to the determined dimming pixel to be filtered, wherein the first filtering region is centered on the determined dimming pixel to be filtered, the first filtering region comprises a first predetermined number of dimming pixels in a first direction and a second direction intersecting the first direction;
   determining a filtering parameter of each of the dimming pixels in the first filtering region according to a relationship between each of the dimming pixels in the first filtering region and initial dimming pixel data of each of the dimming pixels in the first filtering region; and
   updating dimming pixel data of the dimming pixel to be filtered according to the filtering parameter of each of the dimming pixels in the first filtering region, so as to obtain updated dimming pixel data.

2. The dimming method according to claim 1, wherein the determining a filtering parameter of each of the dimming pixels in the first filtering region according to a relationship between each of the dimming pixels in the first filtering region and initial dimming pixel data of each of the dimming pixels in the first filtering region comprises:
  determining a first filtering coefficient K1 of each of the dimming pixels in the first filtering region according to the initial dimming pixel data of each of the dimming pixels in the first filtering region,
  wherein the first filtering coefficient of each of the dimming pixels in the first filtering region is positively correlated with the initial dimming pixel data of each of the dimming pixels in the first filtering region.

3. The dimming method according to claim 1, wherein the determining a filtering parameter of each of the dimming pixels in the first filtering region according to a relationship between each of the dimming pixels in the first filtering region and initial dimming pixel data of each of the dimming pixels in the first filtering region comprises:
  determining a second filtering coefficient K2 of each of the dimming pixels in the first filtering region according to a first contrast curve,
  wherein a first contrast is a ratio of the initial dimming pixel data of the dimming pixel to be filtered in the first filtering region to the initial dimming pixel data of each of the dimming pixels in the first filtering region, and the first contrast curve indicates a relationship between the second filtering coefficient and the first contrast.

4. The dimming method according to claim 1, wherein the determining a filtering parameter of each of the dimming pixels in the first filtering region according to a relationship between each of the dimming pixels in the first filtering region and initial dimming pixel data of each of the dimming pixels in the first filtering region comprises:
  determining a third filtering coefficient K3 of each of the dimming pixels in a second filtering region according to a second contrast curve,
  wherein the second filtering region is centered on the determined dimming pixel to be filtered, the second filtering region comprises a second predetermined number of dimming pixels in the first direction and the second direction, and the second predetermined number is less than the first predetermined number,
  a second contrast is a ratio of a maximum value of the initial dimming pixel data of each of the dimming pixels in the second filtering region to the initial dimming pixel data of each of the dimming pixels in the second filtering region, and the second contrast curve indicates a relationship between the third filtering coefficient and the second contrast.

5. The dimming method according to claim 1, wherein the determining a filtering parameter of each of the dimming pixels in the first filtering region according to a relationship between each of the dimming pixels in the first filtering region and the initial dimming pixel data of each of the dimming pixels in the first filtering region comprises:
  determining a fourth filtering coefficient K4 of each of the dimming pixels in the first filtering region according to a distance between each of the dimming pixels in the first filtering region and the dimming pixel to be filtered,
  wherein the fourth filtering coefficient of each of the dimming pixels in the first filtering region is negatively correlated with the distance between each of the dimming pixels in the first filtering region and the dimming pixel to be filtered.

6. The dimming method according to claim 2, wherein the determining a first filtering coefficient of each of the dimming pixels in the first filtering region according to the initial dimming pixel data of each of the dimming pixels in the first filtering region comprises:
  determining, by using a first filtering coefficient formula, the first filtering coefficient of each of the dimming pixels in the first filtering region according to the initial dimming pixel data of each of the dimming pixels in the first filtering region,
  wherein the first filtering coefficient formula is expressed as:

$$K1 = -\frac{1}{255^2} \times V^2 + \frac{2}{255} \times V$$

where V represents the initial dimming pixel data of each of the dimming pixels.

7. The dimming method according to claim 3, wherein in the first contrast curve, for the first contrast in an interval of [0,1], the second filtering coefficient K2 is negatively correlated with the first contrast; and for the first contrast greater than or equal to 1, the second filtering coefficient K2 is equal to 1.

8. The dimming method according to claim 4, wherein in the second contrast curve, the third filtering coefficient K3 is negatively correlated with the second contrast.

9. The dimming method according to claim 5, wherein the determining a filtering parameter of each of the dimming pixels in the first filtering region according to a relationship between each of the dimming pixels in the first filtering region and the initial dimming pixel data of each of the dimming pixels in the first filtering region comprises:
  determining a filtering coefficient K of each of the dimming pixels in the first filtering region according to a first filtering coefficient K1, a second filtering coefficient K2, a third filtering coefficient K3 and a fourth filtering coefficient K4;
  normalizing the filtering coefficient K of each of the dimming pixels in the first filtering region to obtain a normalized filtering coefficient KA of each of the dimming pixels in the first filtering region;
  calculating a sum KAS of the normalized filtering coefficients KA of each of the dimming pixels in the first filtering region; and
  dividing the normalized filtering coefficient KA of each of the dimming pixels in the first filtering region by the sum KAS to obtain the filtering parameter of each of the dimming pixels in the first filtering region.

10. The dimming method according to claim 4, wherein the first predetermined number is 5, and the second predetermined number is 3.

11. The dimming method according to claim 1, wherein the display panel further comprises a backlight source arranged on a side of the dimming screen away from the display screen and configured to provide a backlight, the display screen comprises a plurality of display partitions, the backlight source comprises a plurality of backlight partitions, the plurality of display partitions correspond to the plurality of backlight partitions respectively, and the display partition comprises a plurality of display pixels; the dimming method further comprises:
  determining a display partition requiring dimming and a backlight partition corresponding to the display partition requiring dimming according to a display pixel to be dimmed;

determining a plurality of dimming pixels corresponding to the display partition requiring dimming; and determining a backlight value of the backlight partition corresponding to the display partition requiring dimming according to updated dimming pixel data of the plurality of dimming pixels corresponding to the display partition requiring dimming.

12. The dimming method according to claim 11, wherein the plurality of dimming pixels corresponding to the display partition requiring dimming comprise a first dimming pixel, a second dimming pixel and a third dimming pixel, an orthographic projection of the first dimming pixel on the display screen at least partially overlaps with at least one of the plurality of display pixels in the display partition requiring dimming, the second dimming pixel and the third dimming pixel are adjacent to the first dimming pixel in the second direction respectively, and the second dimming pixel and the third dimming pixel are located on opposite sides of the first dimming pixel in the second direction.

13. The dimming method according to claim 12, wherein the determining a backlight value of the backlight partition corresponding to the display partition requiring dimming according to updated dimming pixel data of the plurality of dimming pixels corresponding to the display partition requiring dimming comprises:

determining the backlight value of the backlight partition corresponding to the display partition requiring dimming according to the updated dimming pixel data of the plurality of dimming pixels corresponding to the display partition requiring dimming by using a weighted summation method.

14. The dimming method according to claim 13, wherein the dimming method further comprises:

determining initial display pixel data of a display pixel to be dimmed according to the image data; and determining a compensation coefficient of the display pixel to be dimmed according to the initial display pixel data of the display pixel to be dimmed and the backlight value of the backlight partition corresponding to the display pixel to be dimmed.

15. The dimming method according to claim 14, wherein the compensation coefficient of the display pixel to be dimmed is determined according to the initial display pixel data of the display pixel to be dimmed and the backlight value of the backlight partition corresponding to the display pixel to be dimmed by using a compensation coefficient formula, the compensation coefficient formula is expressed as:

$$\left(\frac{Q}{1023}\right)^{\gamma 2} = f\left(\frac{\left(\frac{W}{255}\right)^{\gamma 0} \times 2^{16} \times \frac{1}{SBL^{\gamma 1}} \times 12^{19}}{2^{11}}\right)$$

where $Q$ represents the compensation coefficient, W represents the initial display pixel data, SBL represents the backlight value, f represents rounding, and $\gamma 0$, $\gamma 1$ and $\gamma 2$ are preset values.

16. The dimming method according to claim 15, wherein the dimming method further comprises: adjusting display pixel data of the display pixel to be dimmed according to the determined compensation coefficient of the display pixel to be dimmed.

17. The dimming method according to claim 1, wherein an orthographic projection of one dimming pixel on the display screen at least partially overlaps with a plurality of display pixels arranged in m rows and m columns, where m is a positive integer greater than 1;

the determining initial dimming pixel data of each of the dimming pixels according to the image data comprises:

determining initial display pixel data of each of the display pixels according to the image data; and determining, according to the initial display pixel data of the plurality of display pixels arranged in m rows and m columns, the initial dimming pixel data of the dimming pixel overlapping with the plurality of display pixels arranged in m rows and m columns.

18. The dimming method according to claim 17, wherein the determining, according to the initial display pixel data of the plurality of display pixels arranged in m rows and m columns, the initial dimming pixel data of the dimming pixel overlapping with the plurality of display pixels arranged in m rows and m columns comprises:

progressively sampling the plurality of display pixels arranged in m rows and m columns to obtain sampling data of each row, wherein the sampling data of each row is a weighted sum of a maximum value and a mean value of the initial display pixel data of a plurality of display pixels in the row; and determining the maximum value in the sampling data of m rows as the initial dimming pixel data of the dimming pixel.

19. A display device, comprising:

one or more processors;

a storage device configured to store one or more programs, wherein the one or more programs, when executed by the one or more processors, cause the one or more processors to implement the method according to claim 1.

20. A computer-readable storage medium having an executable instruction stored thereon, wherein the instruction, when executed by a processor, causes the processor to implement the method according to claim 1.

* * * * *